United States Patent [19]
Marinaro

[11] Patent Number: 5,125,006
[45] Date of Patent: Jun. 23, 1992

[54] LOCAL AREA NETWORK HIGH IMPEDANCE TRANSCEIVER

[75] Inventor: Frank Marinaro, Dix Hills, N.Y.

[73] Assignee: Standard Microsystems Corporation, Hauppauge, N.Y.

[21] Appl. No.: 447,616

[22] Filed: Dec. 8, 1989

[51] Int. Cl.⁵ .............................................. H04B 1/38
[52] U.S. Cl. ............................................. 375/7; 375/36
[58] Field of Search .................... 375/7, 8, 36, 121; 370/24, 25; 333/12; 307/270; 340/825.5, 825.74

[56] References Cited

U.S. PATENT DOCUMENTS

| | | | |
|---|---|---|---|
| 3,721,958 | 3/1973 | Dixon | 375/7 |
| 3,875,332 | 4/1975 | Fletcher et al. | 375/36 |
| 3,973,170 | 8/1976 | Hogan | 375/7 |
| 4,038,601 | 7/1977 | Laborie et al. | 375/36 |
| 4,086,534 | 4/1978 | Olson | 375/7 |
| 4,205,360 | 5/1980 | Drucker | 375/7 |
| 4,803,699 | 2/1989 | Graham | 375/36 |
| 4,896,349 | 7/1990 | Kubo et al. | 375/36 |

Primary Examiner—Stephen Chin
Attorney, Agent, or Firm—Hopgood, Calimafde, Kalil, Blaustein & Judlowe

[57] ABSTRACT

A transceiver for use in a local area network presents a high impedance to the cable when the transceiver is in its off state, that is, when it is not in the transmit mode. During the off state, the transformer that couples the transceiver to the cable is isolated from the transmitter section by reverse-biased diodes, which are forward biased when the transceiver is in the transmit or low-impedance mode.

31 Claims, 1 Drawing Sheet

LOCAL AREA NETWORK HIGH IMPEDANCE TRANSCEIVER

BACKGROUND OF THE INVENTION

1. Field of the Invention

The present invention relates generally to local area networks, and more particularly to a network for effectively connecting a plurality of information nodes to a single cable in a local area network.

2. Prior Art

Local area networks, which permit digital data communications between personal computers, printers, work stations and similar data stations, are commonly used in offices, factories and similar locations to allow digital data communication, typically over coaxial cable or twisted pairs of transmission lines, between different computers and associated peripheral work stations at spaced locations within the office or factory facility. Local area networks thus, for example, permit users of personal computers to share applications programs, printers, plotters, and files, while independently employing the memories and computing power of the individual computers.

Several techniques, including the use of token-passing networks, are employed to control the transmission of digital data through the transmission lines between the computers to prevent two or more different streams of data from colliding, thereby to resolve the intended destinations of the data in the network.

One known local area token-passing network includes a plurality of multi-port transceiver-repeaters or hubs. In this system each node or computer station in the local area network is connected directly to one port of an active hub through a transceiver to a dedicated coaxial cable in a so-called modified tree structure. A network controller, which provides the necessary interface functions between the work station and computer or the like and the other portions of the network, is typically coupled to the cable by means of a transceiver. The transceiver processes the data to be transmitted from, or received by, the network controller for use by the network. Each of the transceivers in the network preferably has an output impedance that is substantially equal to the characteristic impedance of the cable, in accordance with conventional transmission line theory, which holds that signal reflection is avoided by terminating a cable with its characteristic impedance. However, if two of such transceivers are connected to one port of a hub, the cable would no longer be properly terminated in its characteristic impedance and signal transmission would then be deleteriously affected. The designer of the conventional local area network is thus typically required to supply one hub port for each node in the network, and a dedicated cable must be run from each node to a hub port. These requirements significantly increase both the cost and complexity of the local area network because of the relatively large amount of cables required and the number of active hub ports required for the network.

U.S. Pat. No. 4,775,864, assigned to the same assignee as the present invention, discloses a high-impedance transceiver for use in a local area network to connect a plurality of local area networks to a common cable which is terminated at its characteristic impedance, typically 93 ohms. The output impedance of each transceiver in the receiver node is high, in the order of 5,000 ohms. This allows a large number of work stations or the like to be connected through their respective network controllers to the cable without unduly loading down the cable. During the transmit mode, the impedance of the transceiver is low, but since only one personal computer is typically transmitting data on the network at any given time, this low impedance does not adversely affect network operation.

The high-impedance transceiver disclosed in the aforesaid patent has proven to be advantageous for this purpose, but it had certain disadvantages which limited its utility and acceptance by users of local area networks. One drawback of the high-impedance transceiver disclosed in the patent is that it may draw larger negative currents than are sometimes desired. Another drawback in this prior high-impedance transceiver is that if one personal computer or work station is turned off, such as when its user is ill or is on vacation, the off or powered-down computer can present a low impedance to the cable, thereby losing the advantage and defeating the purpose of the high-impedance transceiver.

It is an object of the present invention to provide an improved high-impedance transceiver for use in a multinode local area network.

It is further object of the invention to provide a high-impedance transceiver of the type described which draws a lesser amount of negative current than in currently known transceivers of this type.

It is another object of the invention to provide a local area network of the type described in which the impedance of the transceiver remains high even when the computer or work station to which it is connected is powered down.

SUMMARY OF THE INVENTION

In accordance with the foregoing, a local area network high-impedance transceiver in accordance with the present invention, has an off impedance, when in its receive mode, that is, when it is not transmitting, which is at least ten times greater than that of the characteristic impedance of the transmission cable to which it and its associated network controller are connected. In the transceiver, this high impedance is achieved and maintained in the receiving mode of operation by the provision of means in the form of rectifiers which isolate the transmitter section of the transceiver from the transformer that couples the transceiver to the cable. This isolating means causes a high input impedance to be reflected across the transformer to the cable when the transceiver is not transmitting. During the transmit mode the rectifiers are forward biased to create the low impedance necessary to drive a properly terminated cable during transmission for the transceiver.

BRIEF DESCRIPTION OF THE DRAWINGS

To the accomplishment of the above and such further objects as may hereinafter appear, the present invention relates to a local area network high impedance transceiver substantially as defined in the appended claims and as described in the following specification considered together with the accompanying drawings in which:

DETAILED DESCRIPTION OF THE INVENTION

Figure 2:
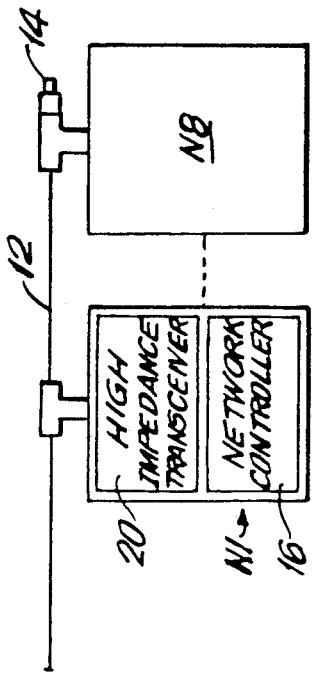
FIG. 2 is a more detailed block diagram of a portion of the network of FIG. 1 showing the manner of connection of the transceiver of the invention to the cable.
Figure 1:
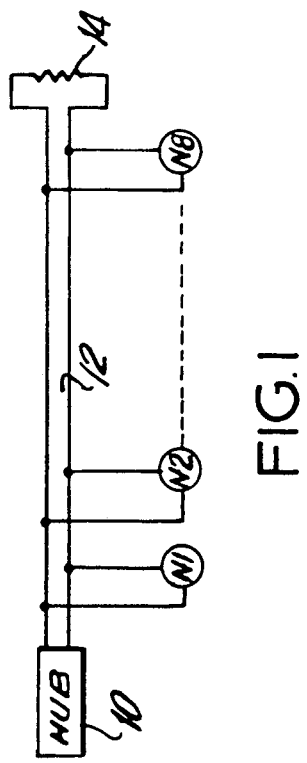
FIG. 1 is a block diagram of a local area network in which the transceiver of the present invention may be used to advantage.

In the local area network of FIG. 1, a plurality of high-impedance nodes N1-N8, eight of which are illustrated, are connected to a single active hub 10 by means of a transmission line 12, which is typically a coaxial cable or twisted pair cable. The line 12 is terminated in its characteristic impedance shown as a terminating resistor 14. For example, if RG62 coaxial cable is employed, the cable is terminated in its characteristic impedance of 93 ohms. As shown in FIG. 2, each of the nodes N includes a conventional network controller 16 such as the COM90C32 and COM90C26 made and sold by Standard Microsystems Corp. As is per se known, the controller 16 interfaces with a host computer, work station or the like, which serves to process data from the computer or work station with which it is interfaced, and transmits that data on the line to other nodes along the network. The connection of the network controller 16 to the line is made through the high-impedance transceiver 20, which is the subject of the present invention, and which, because of its high impedance when it is not transmitting data, provides a more effective way to couple the controller 16 to the line 12 than has been heretofore been achieved.

Figure 3:
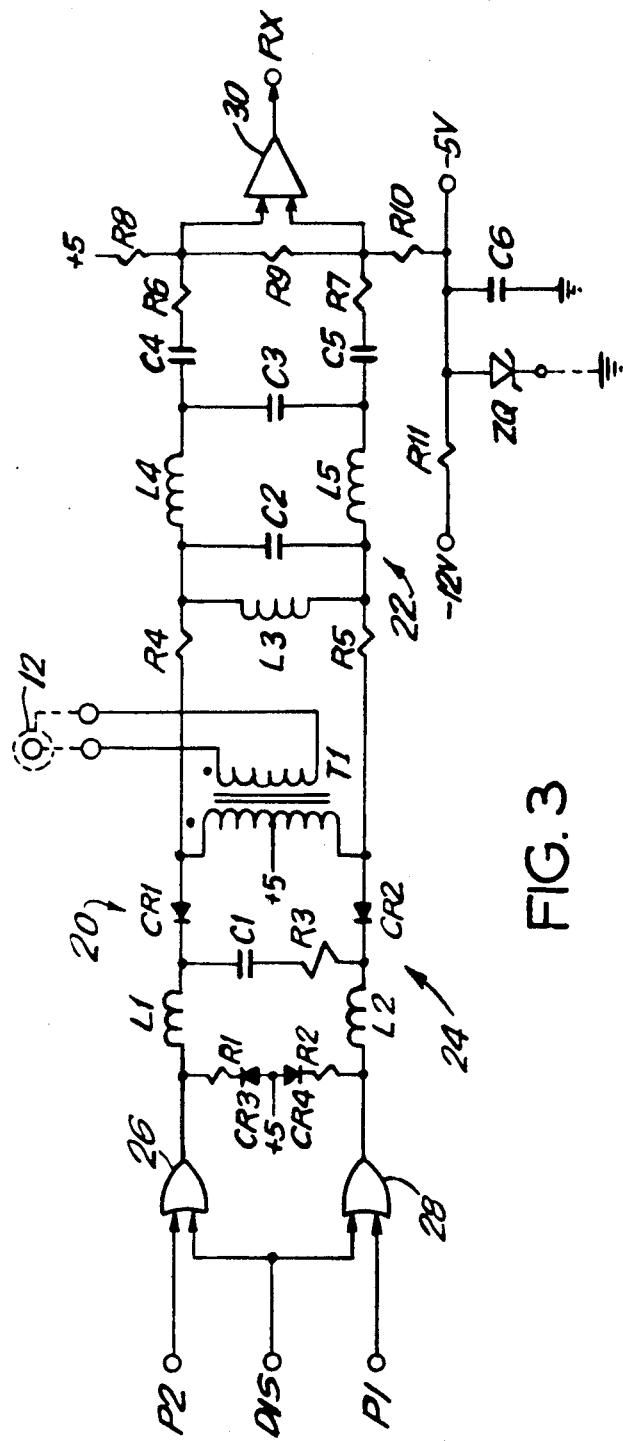
FIG. 3 is a schematic diagram of the transceiver in accordance with one embodiment of the invention.

The high-impedance transceiver 20 of the invention, as in the embodiment illustrated in FIG. 3, includes a receiver section 22 and a transmitter section 24. The transmitter section receives transmit control signals from the network controller 16 at input terminals P1 and P2. These inputs, which may be in the form of a two-level signal, are respectively applied to one input of OR-gates 26 and 28, the other input of which is a transmitter. The outputs of the OR gates 26 and 28 are respectively applied to one end of a pair of chokes L1 and L2. Choke L1 is connected in series with a diode CR3, a resistor R1, diode CR1 and one half of the primary winding of a transformer T1. Choke L2 is connected in series with a diode CR4, oppositely poled as compared to diode CR3, a resistor R2, a diode CR2 and the other half of the primary winding of transformer T1. A positive voltage supply, here +5 volts, is applied to the anodes of diodes CR3 and CR4 and to the center tap of the primary winding of transformer T1. The secondary winding of transformer T1 is connected to the shield and center conductor of the coaxial cable 12. A capacitor C1 and a resistor R3 are connected across the primary winding and to the cathodes of diodes CR1 and CR2.

The data from the network is applied to the high-impedance transceiver 20 from the cable 12 and is passed through a filter to the inputs of a differential amplifier-comparator 30. The input to the amplifier-comparator 30 is obtained from a voltage divider consisting of resistors R8, R9, and R10 connected between a +5 volt supply and a negative voltage established on a line connected between a −5 v supply and a −12 v supply to which are connected a Zener diode ZQ and a capacitor C6 to ground.

The ends of resistor R9 are respectively connected through resistors R6 and R7 and capacitors C4 and C5 to chokes L4 and L5, which, along with parallel connected capacitors C2 and C3, and inductor L3 form a narrow band-pass filter. The inputs of the filter are respectively connected through resistors R4 and R5 to the ends of the primary winding of the transformer T1.

In the operation of the high-impedance transceiver of FIG. 3, during data transmission, data pulses are received from the network controller 16 at inputs P1 and P2. The data inputs in the form of low-going pulses are respectively applied to one of the inputs of the OR gates with the disable input low. The outputs of the two OR gates are applied respectively to chokes L1 and L2, which along with capacitor C1 and resistor R3, remove the high-order harmonics from these pulses so as to produce a sinusoidal signal, which may be typically at a frequency of about 5 mHz. That sinusoidal signal is applied to the primary winding of transformer T1 and is then inductively coupled to the secondary of the transformer and then to the cable.

In the receiving mode of operation of the transceiver of FIG. 3, data is received from the cable and coupled to the transformer. From there the received signal is applied to one end of the narrow band-pass filter consisting of capacitors C2 and C3 and chokes L4 and L5, which may have a band pass centered at the frequency of the data signals, here about 5 mHz, to remove high- and low-frequency noise from the signal. The signals derived from the filter are passed through capacitor C4 and resistor R6, and capacitor C5 and resistor R7, respectively, to remove the dc component from the filtered 5 mHz signal. That signal is applied to the voltage divider consisting of resistors R8, R9, and R10 to establish the desired level of the two inputs to the differential amplifier-comparator 30. As a result, when the signal at the upper input to the comparator is at a higher level than that of the lower input, the comparator will trigger to produce a correct data signal at terminal RX, from which the signal is applied to the network controller.

In the transceiver of the invention, as in the embodiment of FIG. 3, the impedance presented to the cable is always high in the order of 5,000 ohms whenever the transceiver is in the off state, that is, when it is not transmitting. That impedance is advantageously at least ten times the characteristic impedance of the cables but is more desirably at least 2,000 ohms. To this end, the diodes CR1 and CR2 are always reverse biased during the receiving mode by the application of the +5 volts on their cathodes through diodes CR3 and CR4 and resistors R1 and R2, respectively.

The diodes CR1, CR2, CR3 and CR4 thus serve to isolate the transmitter section of the transceiver from the transformer T1 thereby to cause a high input impedance to be reflected at the transceiver input when there is no data transmission. During a transmission mode of operation, all of these diodes are forward biased since they are then connected to ground through the OR gates, thereby creating a low impedance as reflected onto the cable that is required to drive the cable which is properly terminated at both of its ends with its characteristics impedance.

It will be appreciated from the foregoing description of a preferred embodiment that the transceiver of the invention reliably provides a high impedance to the cable whenever it is not transmitting, even when power to the transceiver is turned off, and requires a reduced negative supply current, in the order of only 20 mamp, since a negative supply voltage is needed only for the operation of the comparator. It will also be appreciated that modifications may be made to the embodiment of the invention hereinabove disclosed without necessarily departing from the spirit and scope of the invention.

What is claimed is:

1. A transceiver for use in a local area network to couple a controller to a transmission line, said transceiver comprising a receiver section and a transmitter section, means for coupling said transmitter section to the transmission line, power supply means for applying an operating voltage to the transceiver, and means for electrically isolating said coupling means from said transmitter section when the transceiver is not in a transmit mode of operation, said isolating means comprising means capable of selectively being placed in one of a conductive and a nonconductive state and effective when in said nonconductive state to unconditionally establish a high impedance of the transceiver to the transmission line whenever the transceiver is not in a transmit mode of operation irrespective of whether or not said power supply means is providing an operating voltage to the transceiver.

2. The transceiver of claim 1, in which said isolating means includes unidirectional conducting means and means for placing said unidirectional conducting means in a nonconductive state wherever the transceiver is not in a transmit mode of operation.

3. The transceiver of claim 2, in which said coupling means includes a transformer having a primary winding coupled to said isolating means and a secondary winding for coupling to the transmission line.

4. The transceiver of claim 3, in which said isolating means includes at least one diode and said means for placing said diode in a non-conducting condition includes means for reverse-biasing said diode.

5. The transceiver of claim 4, in which said isolating means comprises first and second diodes having anodes in respective series connection with said primary winding and cathodes connected to said reverse-biasing means.

6. The transceiver of claim 5, further including means for forward biasing said first and second diodes when the transceiver is in the transmit mode of operation.

7. The transceiver of claim 6, in which said reverse biasing means includes means coupled to said first and second diodes for applying a positive voltage to the cathodes of said diodes.

8. The transceiver of claim 7, further comprising third and fourth diodes respectively connected between the source of said positive voltage and the cathodes of said first and second diodes.

9. The transceiver of claim 8, further comprising first and second inductances respectively coupled between said third and fourth diodes and said first and second diodes.

10. The transceiver of claim 9, further comprising a capacitor connected across the opposite ends of said first and second inductances.

11. The transceiver of claim 4, further comprising means for removing the reverse-bias voltage from said diode when the transceiver is in the transmit mode.

12. The transceiver of claim 11, in which said isolating means comprises first and second diodes having anodes in respective series connection with said primary winding and cathodes connected to said reverse-biasing means.

13. The transceiver of claim 12, further including means for forward biasing said diodes when the transceiver is in the transmit mode of operation.

14. The transceiver of claim 13, in which said reverse biasing means includes means coupled to said first and second diodes for applying a positive voltage to the cathodes of said diodes.

15. The transceiver of claim 14, further comprising third and fourth diodes respectively connected between the source of said positive voltage and the cathodes of said first and second diodes.

16. The transceiver of claim 15, further comprising first and second inductances respectively coupled between said third and fourth diodes and said first and second diodes.

17. The transceiver of claim 16, further comprising a capacitor connected across the opposite ends of said first and second inductances.

18. The transceiver of claim 2, in which said isolating means includes at least one diode, and said means for placing said diode in a nonconductive state includes means for reverse biasing said diode.

19. The transceiver of claim 18, in which said isolating means comprises first and second diodes having their anodes coupled to said receiver section and their cathodes connected to said reverse biasing means.

20. The transceiver of claim 19, further including means for forward biasing said first and second diodes when the transceiver is in the transit mode of operation.

21. The transceiver of claim 20, in which said reverse biasing means includes means coupled to said first and second diodes for applying a positive voltage to the cathodes of said diodes.

22. The transceiver of claim 21, further comprising third and fourth diodes respectively connected between the source of said positive voltage and the cathodes of said first and second diodes.

23. The transceiver of claim 22, further comprising first and second inductances respectively coupled between said third and fourth diodes and said first and second diodes.

24. The transceiver of claim 23, further comprising a capacitor connected across the opposite ends of said first and second inductances.

25. The transceiver of claim 18, further comprising means for removing the reverse-biasing voltage from said diode when the transceiver is in the transmit mode.

26. The transceiver of claim 25, further including means for forward biasing said first and second diodes when the transceiver is in the transit mode of operation.

27. The transceiver of claim 26, in which said reverse biasing means includes means coupled to said first and second diodes for applying a positive voltage to the cathodes of said diodes.

28. The transceiver of claim 27, further comprising third and fourth diodes respectively connected between the source of said positive voltage and the cathodes of said first and second diodes.

29. A transceiver for use in a local area network to couple a controller to a transmission line, said transceiver being capable of operating in a transmit or receive mode of operation and including a receiver section and a transmitter section, means included in said transmitter section for electrically isolating said transmitter section from the transmission line when the transceiver is not in a transmit mode of operation, said isolating means including first, second, third and fourth unidirectional conducting means, said first and second unidirectional conducting means and said third and fourth unidirectional conducting means being respectively operatively connected to one another in an opposing conductive relationship, and means for placing said unidirectional conducting means in a nonconductive state when the transceiver is not in the transmit mode of operation, whereby the transceiver is maintained in a high-impedance state when not in the transmit mode of operation, said unidirectional conducting means including first, second, third and fourth diodes, the cathodes of said first and second diodes and of said third and fourth diodes being coupled to one another, and the anodes of said second and third diodes being coupled to one another.

30. The transceiver of claim 29, further comprising means for inductively coupling said transmitter and receiver sections to the transmission line, said inductive means being connected to the anodes of said first and fourth diodes.

31. The transceiver of claim 29, further comprising power supply means for applying a positive voltage to the anodes of said second and third diodes and to the anodes of said first and fourth diodes.

* * * * *